United States Patent
Baumgartner et al.

(10) Patent No.: US 9,409,547 B2
(45) Date of Patent: Aug. 9, 2016

(54) SENSOR (71) Applicant: Takata AG, Aschaffenburg (DE)

(72) Inventors: Peter Baumgartner, Günzburg (DE); Hermann Hasse, Lonsee (DE); Oswald Lustig, Asselfingen (DE); Thomas Bertram, Senden (DE)

(73) Assignee: TAKATA AG, Aschaffenburg (DE)

( * ) Notice: Subject to any disclaimer, the term of this patent is extended or adjusted under 35 U.S.C. 154(b) by 69 days.

(21) Appl. No.: 14/357,493

(22) PCT Filed: Nov. 7, 2012

(86) PCT No.: PCT/DE2012/200071
§ 371 (c)(1),
(2) Date: May 9, 2014

(87) PCT Pub. No.: WO2013/071928
PCT Pub. Date: May 23, 2013

(65) Prior Publication Data
US 2014/0305203 A1    Oct. 16, 2014

(30) Foreign Application Priority Data

Nov. 18, 2011 (DE) .......................... 10 2011 086 656

(51) Int. Cl.
*G01D 11/24*    (2006.01)
*B60R 22/48*    (2006.01)
*B60R 22/40*    (2006.01)

(52) U.S. Cl.
CPC ................ *B60R 22/48* (2013.01); *B60R 22/40* (2013.01); *B60R 2022/401* (2013.01); *B60R 2022/4808* (2013.01)

(58) Field of Classification Search
USPC ........................................................... 73/431
See application file for complete search history.

(56) References Cited

U.S. PATENT DOCUMENTS

| | | |
|---|---|---|
| 3,927,286 A | 12/1975 | Fohl |
| 4,350,313 A | 9/1982 | Adomeit |
| 4,687,253 A | 8/1987 | Ernst et al. |
| 4,934,626 A | 6/1990 | Kimura |
| 5,178,410 A | 1/1993 | Thuen et al. |
| 5,209,421 A | 5/1993 | Fujiwara et al. |
| 5,251,843 A | 10/1993 | Kielwein et al. |
| 5,340,052 A | 8/1994 | Ernst |
| 5,443,224 A | 8/1995 | Patterson et al. |

(Continued)

FOREIGN PATENT DOCUMENTS

| | | | | |
|---|---|---|---|---|
| BR | WO 2008049181 A1 * | 5/2008 | ............. | B60R 22/40 |
| DE | 2 228 683 A1 | 12/1973 | | |

(Continued)

OTHER PUBLICATIONS

International Search Report; PCT/DE2012/200071; issued May 23, 2013; 3 pages.

*Primary Examiner* — Lisa Caputo
*Assistant Examiner* — Jamel Williams
(74) *Attorney, Agent, or Firm* — Gordon & Rees LLP (57) ABSTRACT

The invention relates inter alia to a sensor (10), in particular for triggering a vehicle security device (1). According to the invention the sensor (10) comprises a support element (40) and a housing part (70), which holds the support element (40), and the housing part (70) consists of a softer material than the support element (40).

7 Claims, 8 Drawing Sheets

(56) References Cited

U.S. PATENT DOCUMENTS

| | | |
|---|---|---|
| 6,082,655 A | 7/2000 | Verellen et al. |
| 6,305,633 B1 | 10/2001 | Asagiri et al. |
| 6,722,601 B2 | 4/2004 | Kohlndorfer et al. |
| 6,957,790 B2 | 10/2005 | Kielwein et al. |
| 8,047,573 B2 | 11/2011 | Friedsmann et al. |
| 2012/0126046 A1 | 5/2012 | Wulff |

FOREIGN PATENT DOCUMENTS

| | | | |
|---|---|---|---|
| DE | 26 46 238 A1 | 4/1978 | |
| DE | 80 09 960 U1 | 8/1980 | |
| DE | 84 15 088.2 U1 | 10/1984 | |
| DE | 83 24 794 U1 | 5/1985 | |
| DE | 34 18 378 A1 | 2/1986 | |
| DE | 84 36 4790.3 U1 | 4/1986 | |
| DE | 42 43 101 A1 | 7/1993 | |
| DE | 4243101 A1 * | 7/1993 | ............ B60R 21/33 |
| DE | 600 25 699 T2 | 7/2006 | |
| DE | 10 2005 032 808 A1 | 1/2007 | |
| DE | 10 2008 008 041 A1 | 7/2008 | |
| DE | 10 2007 049 200 A1 | 4/2009 | |
| DE | 10 2009 018 177 A1 | 11/2010 | |
| DE | 44 18 026 B4 | 8/2011 | |
| EP | 0 186 105 B1 | 5/1990 | |
| EP | 0 477 918 A1 | 4/1992 | |
| EP | 0 185 367 B2 | 3/1993 | |
| EP | 0 528 230 B1 | 11/1995 | |
| EP | 0 700 812 A1 | 3/1996 | |
| EP | 0700812 A1 * | 3/1996 | ............ B60R 22/40 |
| EP | 1 519 860 A1 | 4/2005 | |
| GB | 2 154 853 A | 9/1985 | |
| GB | 2 278 894 A | 12/1994 | |
| JP | 2003-212086 A | 7/2003 | |
| WO | WO 2004/005085 A1 | 1/2004 | |
| WO | WO 2008/049181 A1 | 5/2008 | |
| WO | WO 2011 015318 A1 | 2/2011 | |

* cited by examiner

SENSOR

The invention relates to a sensor, in particular for triggering a vehicle security device.

A sensor which is suitable for a vehicle security device is disclosed, for example, in the German published patent application DE 10 2008 008 041.

The requirements for motor vehicles relative to noise emissions occurring internally and externally are becoming increasingly stringent. The object of the invention, therefore, is to specify a sensor in which the noise emissions which are present are as low as possible.

This object is achieved according to the invention by a sensor having the features as claimed in claim 1. Advantageous embodiments of the sensor according to the invention are specified in the sub-claims.

Accordingly, it is provided according to the invention that the sensor has a support element and a housing part which holds the support element and the housing part consists of a softer material than the support element.

A substantial advantage of the sensor according to the invention is that in said sensor the noises occurring in the region of the support element of the sensor are damped by the softer material of the housing part, so that overall the sensor produces considerably less sound externally than might be the case if the support element and the housing part consisted of material of the same hardness.

The housing part preferably consists of an elastomer or a soft plastics material.

The sensor is preferably suitable for being inserted between a support device and a covering element (for example in the shape of a covering cap) such that the support element remains separated from the support device and the covering element.

According to a preferred embodiment, it is provided that the housing part has a housing rear wall.

At least one snap element preferably permits the housing rear wall to be snapped into a through-opening of a support device; such a snap element is able to facilitate mounting. The support device may comprise, for example, a plate.

After mounting the housing rear wall in the through-opening of the support device, the snap element preferably engages behind the plane of the through-opening.

Moreover, it is seen as advantageous if the housing rear wall of the housing part has an annular stop portion which, when the housing rear wall is mounted on the through-opening of the support device, bears against the side of the support device facing the support element of the sensor.

The shape of the annular stop portion may be of any kind; it may be circular, oval or even angular. Preferably, the shape is adapted to the contour of the through-opening of the support device, for example such that the housing part is held in the through-opening of the support device in a clamped manner.

The annular stop portion may be interrupted, for example, by the snap element(s).

The housing rear wall preferably has an internal region which, after the housing rear wall has been mounted on the through-opening of the support device, is located on the side of the support device facing the support element of the sensor, on the side of the support device remote from the support element of the sensor or therebetween. Particularly preferably, the internal region is located on the side of the support device remote from the support element of the sensor.

The internal region of the housing rear wall and the annular stop portion are preferably connected by a connecting portion which passes through the plane of the through-opening. Preferably, the connecting portion has a convex surface at least in sections.

The annular shape of the connecting portion which is annular in cross section may be of any kind, but it only has to correlate with the contour of the annular stop portion and/or with the contour of the through-opening of the support device.

The annular connecting portion and/or the stop portion preferably form a sealing ring—against sound and dust—between the cover and frame.

It is also regarded as advantageous if the housing part has two rail portions which extend in parallel and which are oriented perpendicular, obliquely or parallel to the housing rear wall. The support element of the sensor is preferably introduced or inserted between the two rail portions which extend in parallel and is preferably held thereby.

The housing part is preferably in one piece and the two rail portions which extend in parallel are preferably integrally formed on the housing rear wall. Thus the rail portions also preferably consist of a soft plastics material or an elastomer.

The sensor is preferably suitable for triggering a vehicle occupant restraint system, in particular a seat belt retractor.

The sensor may have, for example, an inertia body which with a movement of the sensor may be deflected relative to the support element. The support element may be in indirect or direct mechanical contact with the inertia body: for example the inertia body may bear against the support element or be held thereby. Thus the sensor may be provided, for example, with a lower rolling surface on which the inertia body is able to roll. Alternatively, the sensor may be provided with a pendulum joint which permits the swinging of the inertia body relative to the support element. It is also possible to provide the sensor with a so-called "standing man"; this is a stationary inertia body which in the event of acceleration is able to perform a tilting motion as a result of inertia.

The invention further relates to a vehicle security device having a sensor. According to the invention, it is provided that the vehicle security device has a support device and a covering element, the support element of the sensor is arranged between the support device and the covering element and the support element of the sensor is separated by the housing part of the sensor from the support device.

Relative to the advantages of the vehicle security device according to the invention, reference is made to the above embodiments in combination with the sensor according to the invention, as the advantages of the sensor according to the invention substantially correspond to those of the security device according to the invention.

The support device of the vehicle security device may form, for example, a component of a frame of the vehicle security device.

The covering element is preferably cap-shaped and/or formed by a covering cap.

The support element of the sensor is preferably separated by the housing part not only from the support device but also from the covering element.

Moreover, it is also seen as advantageous if the support device has a through-opening. The housing part preferably has a housing rear wall and at least one snap element which snaps the housing rear wall into the through-opening of the support device. As already mentioned, a snap element may facilitate mounting. The housing rear wall of the housing part preferably has an annular stop portion which in the region of the through-opening of the support device bears against the side of the support device facing the support element of the sensor. The snap element preferably bears against the side of the support device remote from the support element of the sensor and, together with the annular stop portion, preferably produces a positive connection between the housing rear wall of the housing part and the support device. Moreover, the annular stop portion dampens the transmission of noise from the cover to the frame and/or vice versa.

The housing part preferably passes through the plane of the through-opening of the support device and preferably has an internal region which is located on the side of the support device remote from the support element of the sensor. The internal region of the housing rear wall and the annular stop portion are preferably connected by a connecting portion passing through the through-opening of the support device.

The connecting portion is preferably annular and preferably has a convex surface at least in sections.

The housing part preferably has two rail portions which extend in parallel and which are oriented perpendicular, obliquely (for example at an angle of between 0 and 10 degrees) or parallel to the housing rear wall. The support element of the sensor is preferably inserted between the two rail portions which extend in parallel.

If the sensor as an inertia body has a sensor ball which is able to roll on a lower rolling surface, it is seen as advantageous if the lower rolling surface has a bore (preferably in the center of the lower rolling surface) and the sensor ball is mounted in and/or on the bore. The adjacent geometry of the rolling surface is preferably designed such that the sensor ball is not hindered in its movement until it has left the bore. Thus the bore diameter controls at which acceleration and/or inclination the ball is set in motion and as a result the sensor is triggered and, for example, a seat belt retractor is locked.

An alteration to the diameter of the bore (for example for the purposes of production tolerances) has a substantially smaller effect on the movement of the ball and thus on the sensitivity of the sensor than an alteration of the cone angle; in this case the cone angle describes the opening angle of the cone surface which surrounds the bore and on which the sensor ball rolls as soon as it has left the bore. After leaving the bore, the ball runs on the cone surface in order to be able to perform the locking and unlocking functions.

By providing a bore, the sensor is able to be adjusted even more accurately and produced with greater tolerances than might be possible without such a bore.

For setting the sensitivity of the sensor, therefore, advantageously the relationship between the ball diameter and the bore diameter and between the bore diameter and the cone angle may be adjusted. Preferably, the ball-related opening angle β corresponding to the bore diameter (relative to the center of the sensor ball) is greater than the cone angle α defining the cone surface; thus the following preferably applies:

$$\beta > \alpha$$

The cone angle α is preferably at least as great as the unlocking angle predetermined for the sensor if the sensor is inclined.

By means of the additional bore, therefore, the functional range of the sensor may be particularly easily adjusted. It may be produced with greater tolerances than without a bore, and the manufacturability and the quality assurance are simplified. Moreover, noise measurements with different path profiles have shown that by means of the bore the vehicle sensor ball may be brought sooner into rotational movement, which leads to a reduction in the noise of the sensor.

The invention is described in more detail hereinafter with reference to exemplary embodiments; in which, by way of example:

FIG. 1 shows an exemplary embodiment of a vehicle security device according to the invention, which is provided with an exemplary embodiment of a sensor according to the invention, wherein FIG. 1 shows the vehicle security device in an exploded view.

For the sake of clarity, the same reference numerals are always used in the figures for identical or comparable components.

Figure 1:
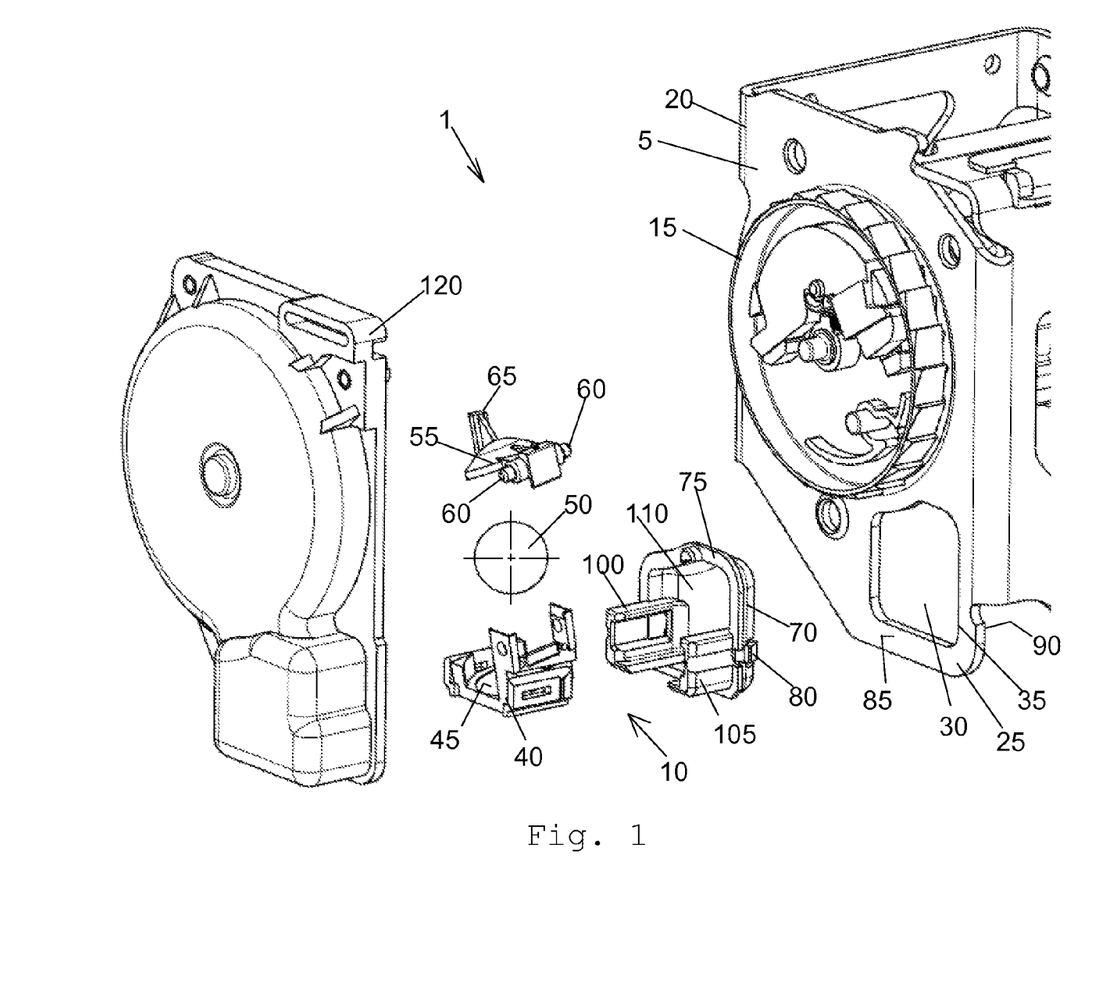

FIG. 1 shows an exemplary embodiment of a vehicle security device 1 which is provided with a seat belt retractor 5 as well as a sensor 10. The seat belt retractor 5 comprises a locking wheel 15 which is connected fixedly in terms of rotation to a belt spool of the belt retractor 5, not shown in FIG. 1. The locking wheel 15 may be locked by the sensor 10 so that a rotation of the locking wheel 15 and thus a rotation of the belt spool of the belt retractor 5 is prevented if the sensor 10 is triggered, for example in the case of a sudden alteration to the vehicle speed.

A frame 20 of the belt retractor 5 which has a plate 25 with a through-opening 30 is also seen in FIG. 1. The plate 25 with the through-opening 30 forms a support device 35 for fastening the sensor 10.

The sensor 10 comprises a support element 40 which is provided with a lower rolling surface 45. An inertia body 50 bears in a rollable manner against the lower rolling surface 45, said inertia body being able to be a ball, for example. A sensor member 55 bears against the inertia body 50, said sensor member being pivotably mounted by pins 60 on the support element 40.

The sensor member 55 is connected to a locking portion 65 which, depending on the pivoting angle of the sensor member 55, may engage in the locking wheel 15 and prevent a rotational movement of the locking wheel 15. The pivoting angle of the sensor member 55 relative to the support element 40 depends on the respective position of the inertia body 50 which is able to roll on the lower rolling surface 45 if the sensor 10 and/or the belt retractor 5 are abruptly moved. For fastening the sensor 10 to the support device 35 and/or in the through-opening 30 of the plate 25, the sensor 10 is provided with a housing part 70 which, amongst other things, comprises an annular stop portion 75 as well as snap elements 80. The housing part 70 may be inserted into the through-opening 30 of the plate 25 such that the annular stop portion 75 bears against the side 85 of the plate 25 facing the support element 40.

The snap element or the snap elements 80 pass through the through-opening 30 and snap on the side 90 of the plate 25 remote from the support element 40, and via an undercut bring about a positive connection of the housing part 70 on the plate 25.

For fastening the support element 40 to the housing part 70, the housing part 70 has two rail portions 100 and 105, which are arranged parallel to one another and extend at least in an approximately perpendicular manner away from the housing rear wall 110. The two rail portions 100 and 105 are shaped so that the support element 40 may be inserted between the two rail portions 100 and 105 along the longitudinal axis of the rail portions and is held by the two rail portions.

After inserting the sensor 10 into the through-opening 30, the sensor 10 and the locking wheel 15 may be covered by means of a covering element 120 which is placed on the plate 25 and/or the frame 20 of the belt retractor 5.

In the exemplary embodiment according to FIG. 1, the housing part 70 consists of a softer material than the support element 40 so that a damping of noise may be achieved by the housing part 70. If, for example, noise is produced due to the rolling motion of the inertia body 50 on the lower rolling surface 45, both the resulting structure-borne sound and the resulting air-borne sound is damped by the softer housing part 70: firstly due to the different material hardness the structure-borne sound is prevented from being able to be transmitted via the housing part 70 to the frame 20 and thus the belt retractor 5 as a whole; secondly by means of the housing rear wall 110 the resulting air-borne sound is prevented from being able to leave the belt retractor 5 through the through-opening 30.

The housing part 70 may consist, for example, of an elastomer (for example soft plastic). The support element 40 may consist, for example, of a plastics material which is harder relative thereto (for example hard plastic), of metal or of metal around which plastics material is injection-molded.

Figure 2:
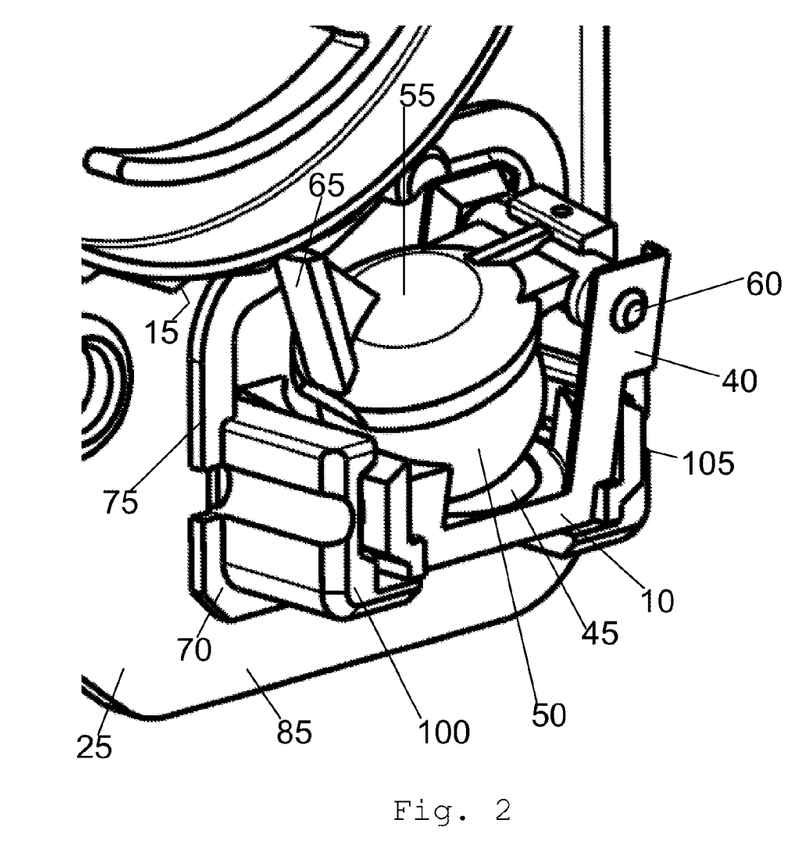
FIG. 2 shows the sensor mounted on a frame of the vehicle security device in a three-dimensional view from the side.

FIG. 2 shows the sensor 10 after inserting the housing part 70 in the through-opening of the plate 25 in more detail. It may be seen that the annular stop portion 75 bears against the side 85 of the plate 25. Moreover, the two rail portions 100 and 105 arranged in parallel may be clearly seen, the support element 40 being clamped therebetween.

FIG. 2 also shows the mode of operation of the sensor member 55 in greater detail, said sensor being pivotably mounted on the support element 40 via the pin 60. Thus it may be seen that the locking portion 65 is able to be inserted into the locking wheel 15 of the belt retractor if the inertia body 50 rolls on the lower rolling surface 45 as a result of inertia.

Figure 3:
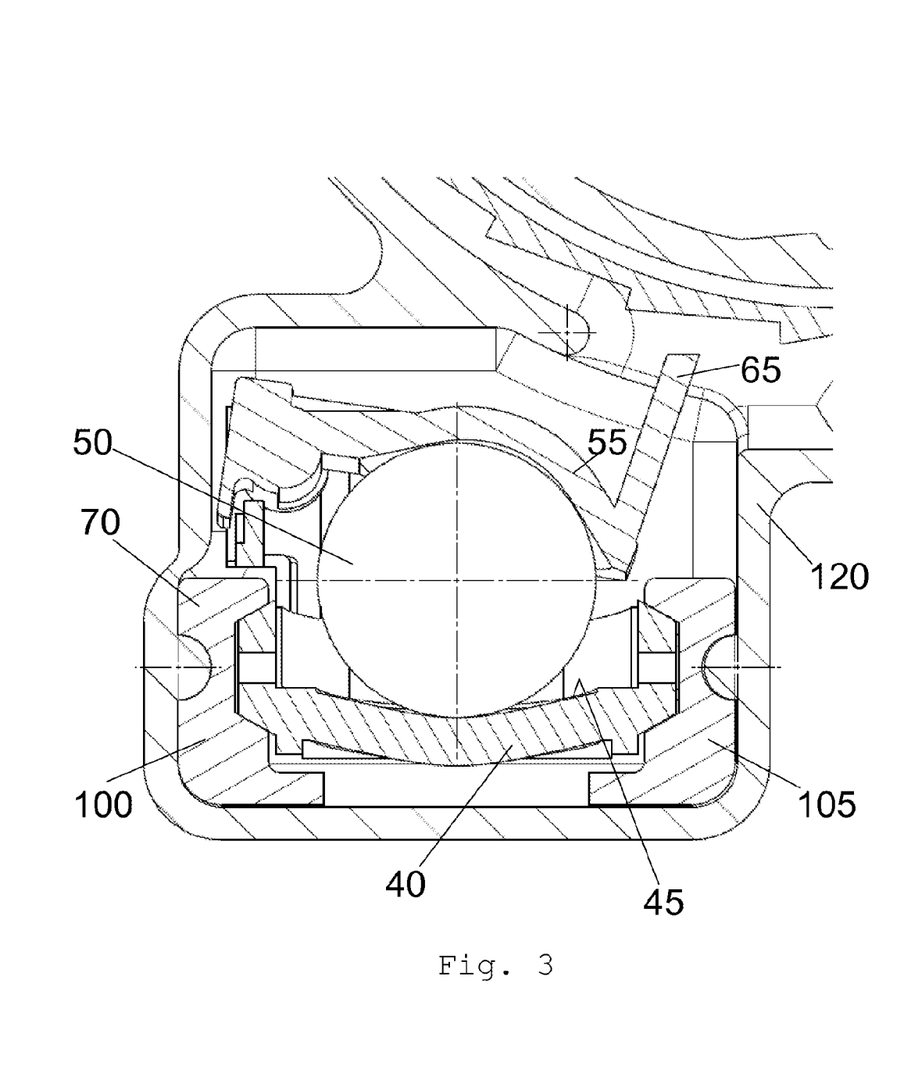
FIG. 3 shows the sensor mounted on the frame of the vehicle security device in a view from the side in cross section.

FIG. 3 shows the sensor mounted on the covering element 120, once again in a cross section. The support element 40 with the lower rolling surface 45, the inertia body located thereon 50 and the sensor member with the locking portion 65 may be clearly identified. Moreover, FIG. 3 shows how the support element 40 is held between the two rail portions 100 and 105 of the housing part 70.

Figure 4:
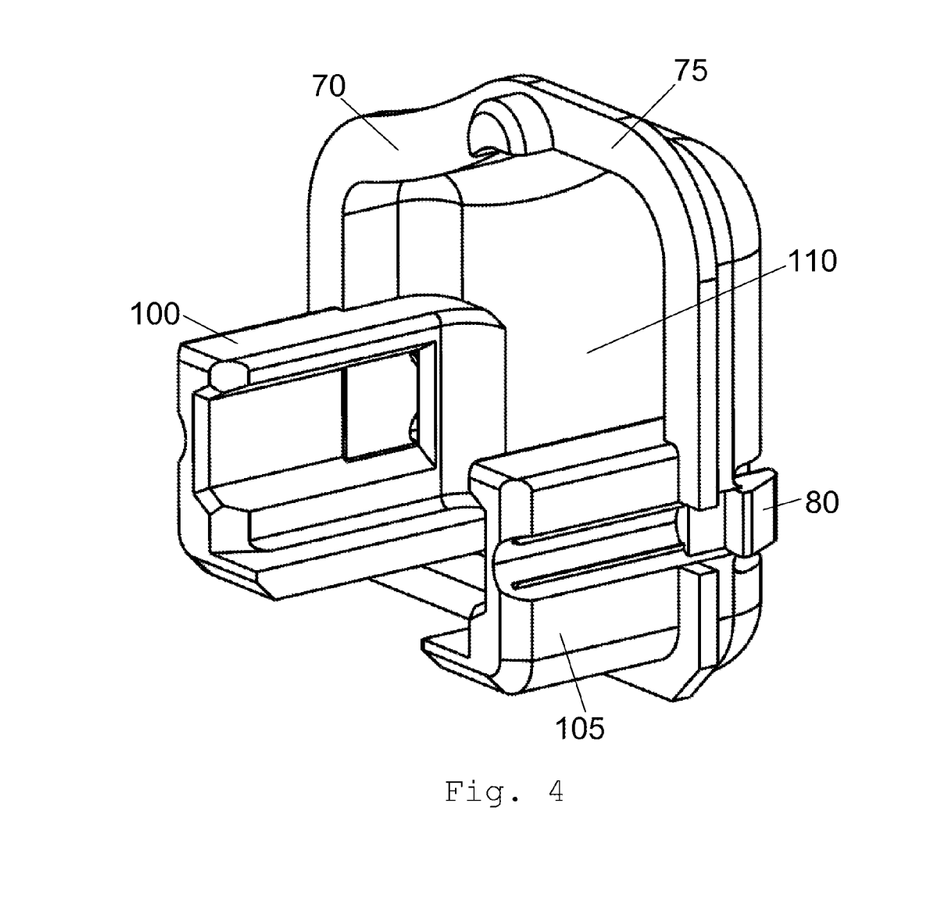
FIG. 4 shows an exemplary embodiment of a housing part for the sensor according to FIG. 1.

FIG. 4 shows the design of the housing part 70 in greater detail. A snap element 80 may be seen, said snap element permitting a positive fastening of the housing part 70 in the through-opening 30 of the plate (see FIG. 1). Moreover, the shape of the annular stop portion 75 is visible, said annular stop portion serving for fastening the housing part 70. FIG. 4 also shows the two rail portions 100 and 105 which are located perpendicular (at least approximately perpendicular) to the housing rear wall 110 and between which the support element 40 (see FIG. 1) may be inserted, resulting in a fastening of the support element 40 on the housing part 70.

Figure 5:
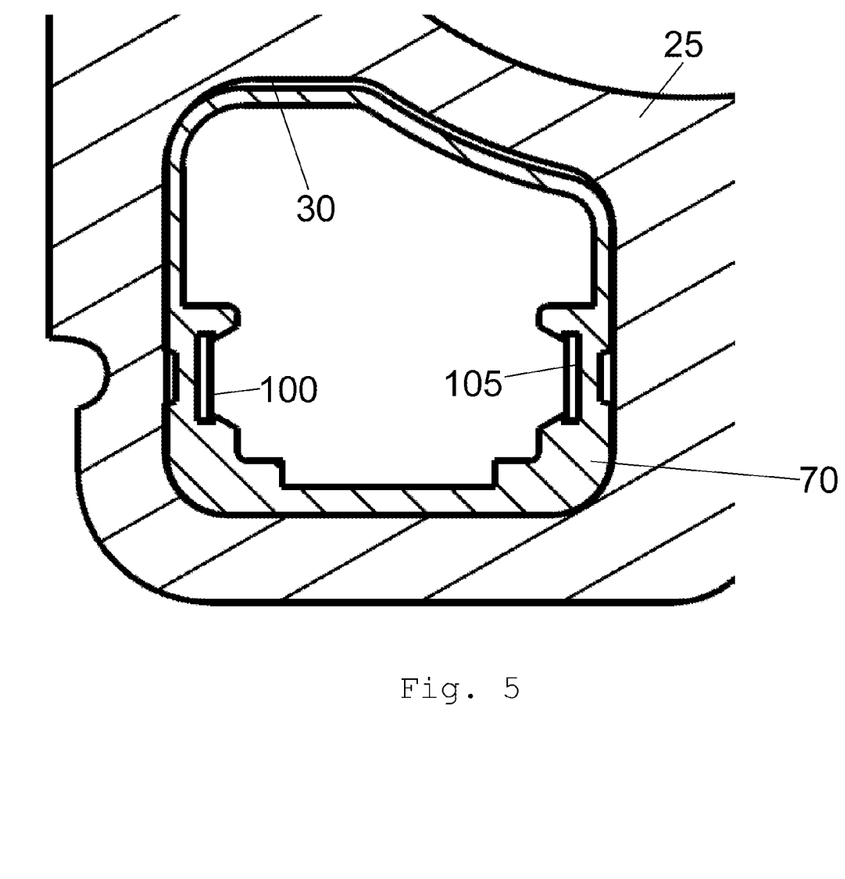
FIG. 5 shows by way of example the mounting of the housing part according to FIG. 4 after mounting in a through-opening of a plate of a frame of the vehicle security device in cross section according to FIG. 1.

FIG. 5 shows the housing part 70 in a cross section after it has been inserted in the through-opening 30 of the plate 25. The two rail portions 100 and 105 may be seen, said rail portions serving for fastening the support element (40). In FIG. 5, it may also be seen that the housing part (70) completely insulates the sensor (10) from the frame (20).

Figure 6:
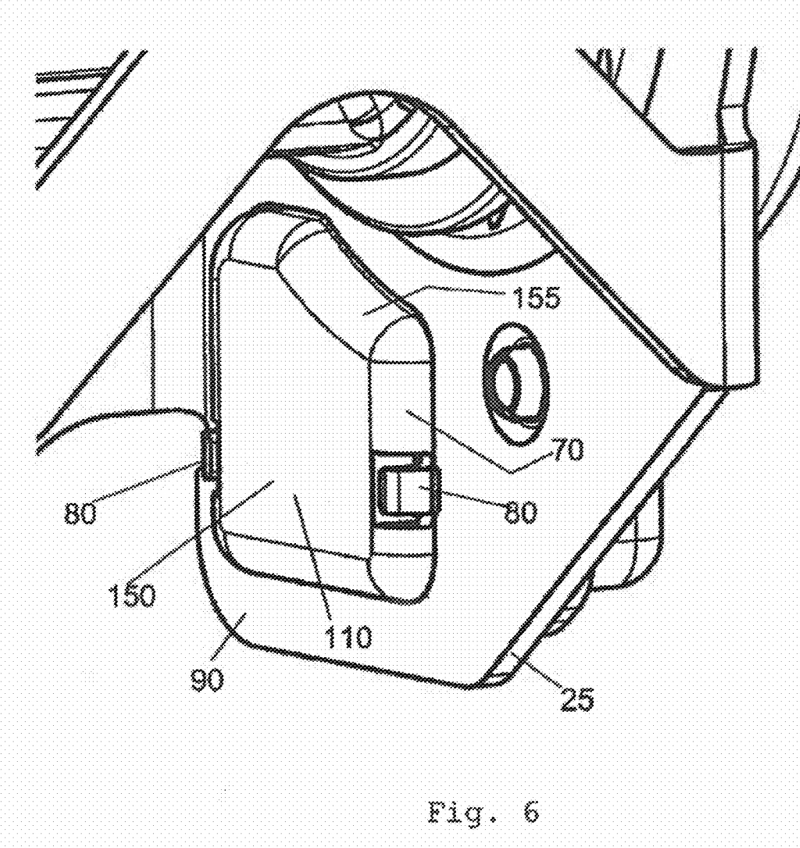
FIG. 6 shows a housing rear wall of the housing part according to FIG. 4 after mounting in a through-opening of a plate.

FIG. 6 shows the fastening of the housing part 70 to the through-opening 30 of the plate 25 in a different view, the side 90 of the plate 25 which is remote from the support element of the sensor being visible. Two snap elements 80, by which the housing part 70 is snapped into the through-opening 30, are visible. Moreover, the shape of the housing rear wall 110 may be identified in more detail. Thus it is seen that the housing rear wall 110 has an internal region 150 which, after the housing rear wall 110 has been mounted, bears against the side 90 of the plate 25. The internal region 150 of the housing rear wall 110 is connected to a connecting portion 155 which surrounds the internal region 150 in an annular manner and is convex. The connecting portion 155 produces a connection between the internal region 150 of the housing rear wall 110 and the annular stop portion 75 (see FIG. 1).

By the shape of the annular, convex connecting portion 155, a resilient connection is advantageously formed between the housing part 70 and the plate 25, so that particularly effective damping of the structure-borne sound is achieved.

The internal region 150 of the housing rear wall 110 advantageously results in effective damping of the sound waves which are produced by the inertia body 50 of the sensor 10.

Figure 7:
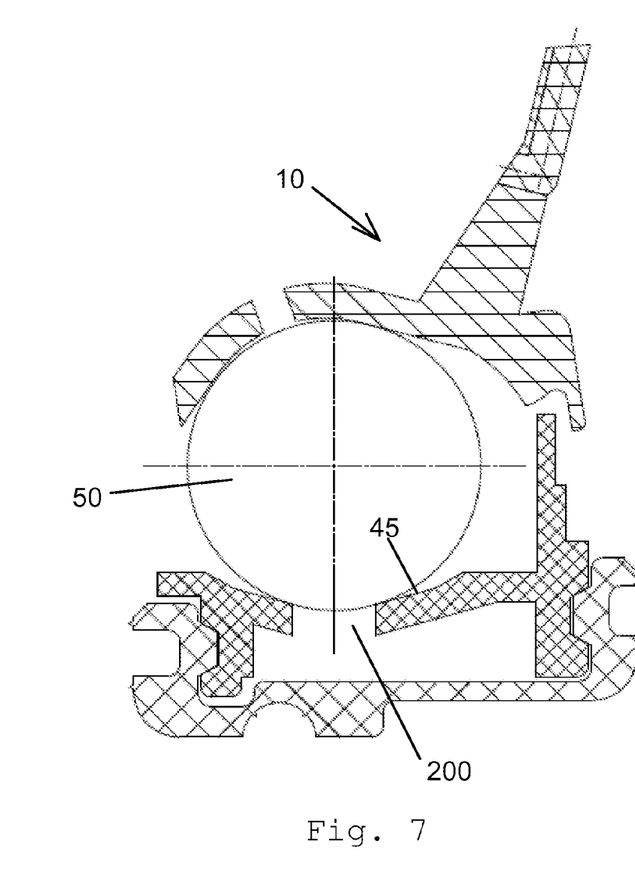
FIG. 7 shows a second exemplary embodiment of a sensor for the vehicle security device according to FIG. 1

FIG. 7 shows a further exemplary embodiment of a sensor 10 for the vehicle security device 1, as shown in FIG. 1. It may be seen that the lower rolling surface 45 has a bore 200 against which the preferably spherical inertia body 50 bears.

Figure 8:
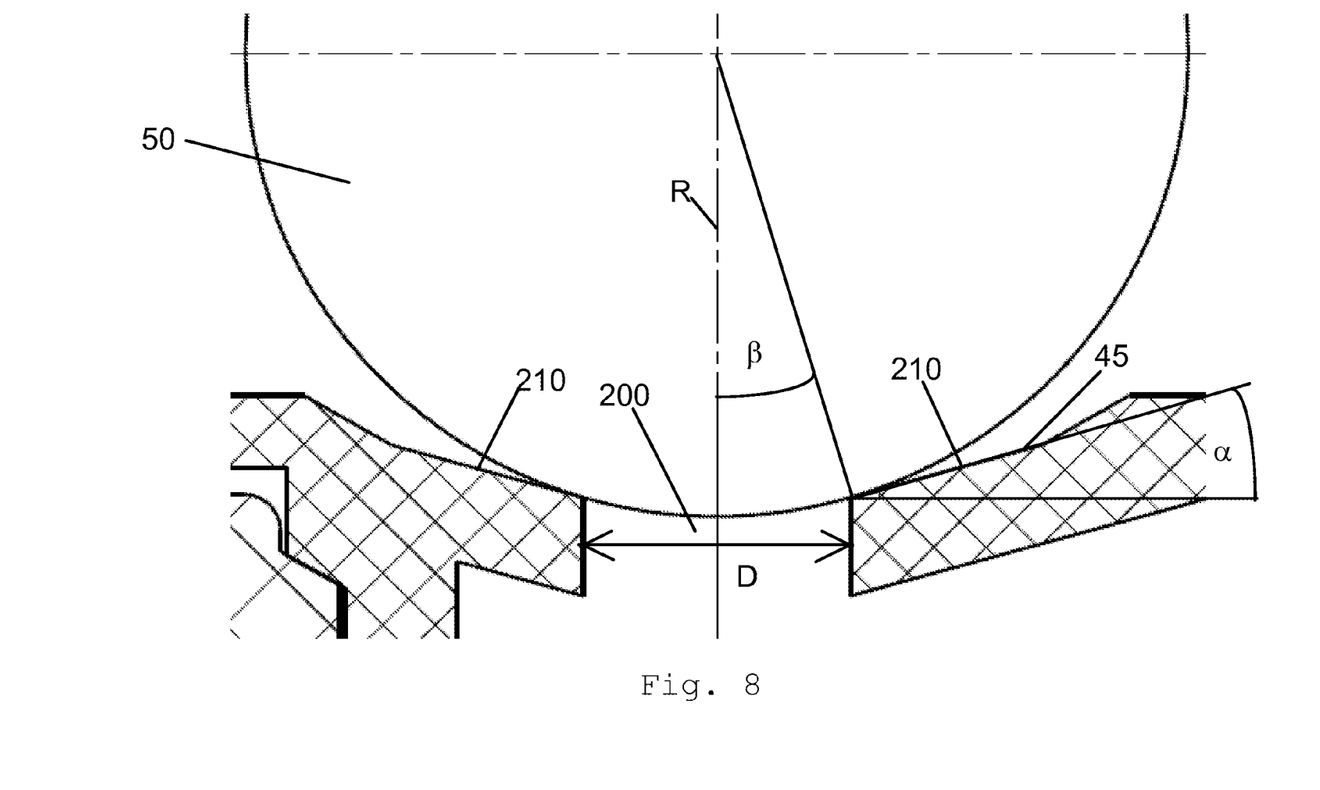
FIG. 8 shows a lower rolling surface of the sensor in greater detail.

FIG. 8 shows the lower rolling surface 45 and the bore 200 in greater detail. It may be seen that the bore 200 is surrounded by a surface running inwardly in a conical manner in the direction of the bore (200), subsequently called the cone surface 210. The angle α between the cone surface 210 and the horizontal H (with a horizontally aligned sensor) is preferably smaller than the ball-related opening angle β of the bore 200. The opening angle β of the bore 200 is calculated approximately as follows:

$$\beta = D/(2*R)$$

wherein D denotes the diameter of the bore 200 and R the radius of the spherical inertia body 50.

The angle α is preferably greater than 14° and is, for example, 16°.

LIST OF REFERENCE NUMERALS

1 Vehicle security device
5 Belt retractor
10 Sensor
15 Locking wheel
20 Frame
25 Plate
30 Through-opening
35 Support device
40 Support element
45 Lower rolling surface
50 Inertia body
55 Sensor member
60 Pin
65 Locking portion
70 Housing part
75 Stop portion
80 Snap element
85 Side facing the support element
90 Side remote from the support element
100 Rail portion 105 Rail portion
110 Housing rear wall
120 Covering element
150 Internal region
155 Connecting portion
200 Bore
210 Cone surface
H Horizontal
α Angle
β Angle

The invention claimed is:

1. A sensor for triggering a vehicle security device, comprising:
   a support element and a housing part which holds the support element, and wherein the housing part consists of a softer material than the support element;
   wherein the housing part has a housing rear wall and at least one snap element which permits the housing rear wall to be snapped into a through-opening of a support device; and
   wherein the housing rear wall of the housing part has an annular stop portion which, when the housing rear wall is mounted on the through-opening of the support device, bears against the side of the support device facing the support element of the sensor.

2. A sensor for triggering a vehicle security device, comprising:
   a support element and a housing part which holds the support element, and wherein the housing part consists of a softer material than the support element;
   wherein the housing part has a housing rear wall and at least one snap element which permits the housing rear wall to be snapped into a through-opening of a support device; and
   wherein the housing rear wall has an internal region which, after the housing rear wall has been mounted on the through-opening of the support device, is located on the side of the support device remote from the support element of the sensor.

3. A sensor for triggering a vehicle security device, comprising:
   a support element and a housing part which holds the support element, and wherein the housing part consists of a softer material than the support element;
   wherein the housing part has two rail portions which extend in parallel in a configuration so that the support element of the sensor can be inserted between the two rail portions in a direction parallel to the rail portions and wherein the rail portions hold the support element in position.

4. The sensor as claimed in claim 3, wherein the housing part has a housing rear wall and at least one snap element which permits the housing rear wall to be snapped into a through-opening of a support device.

5. A vehicle security device including sensor that includes a support element and a housing part which holds the support element, and wherein the housing part consists of a softer material than the support element; the vehicle security device comprising:
   a support device and a covering element;
   wherein the support element of the sensor is arranged between the support device and the covering element;
   wherein the support element of the sensor is separated by the housing part of the sensor from the support device and/or the cover;
   wherein the support device has a through-opening;
   wherein the housing part includes a housing rear wall and at least one snap element which snaps the housing rear wall into the through-opening of the support device;
   wherein the housing rear wall of the housing part has an annular stop portion which in the region of the through-opening of the support device bears against the side of the support device facing the support element of the sensor (10) and
   wherein the snap element bears against the side of the support device remote from the support element of the sensor and, together with the annular stop portion, produces a positive connection between the housing rear wall of the housing part and the support device.

6. The vehicle security device as claimed in claim 5, wherein the housing part passes through the plane of the through-opening of the support device and has an internal region which is located on the side of the support device remote from the support element (40) of the sensor, and the internal region of the housing rear wall and the annular stop portion are connected by a connecting portion passing through the through-opening of the support device.

7. The vehicle security device as claimed in claim 5, wherein the housing part has two rail portions which extend in parallel, and the support element of the sensor is inserted between the two rail portions which extend in parallel.

* * * * *